March 3, 1970  P. H. JOYCE ET AL  3,497,960
TESTING APPARATUS
Filed Sept. 2, 1966  2 Sheets-Sheet 1
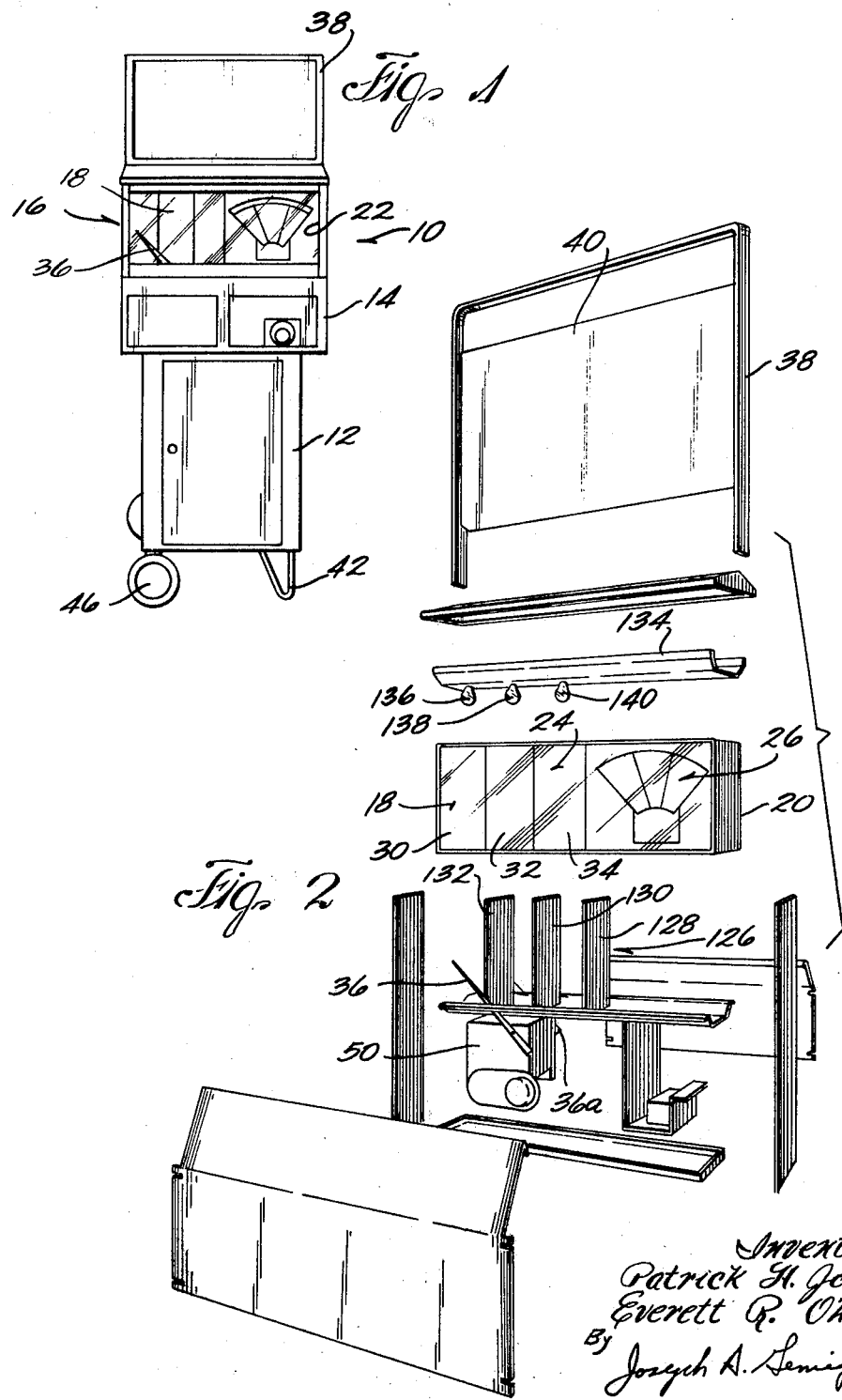
Inventors.
Patrick H. Joyce
Everett R. Ohrmund
By Joseph A. Semignani
Attorney.

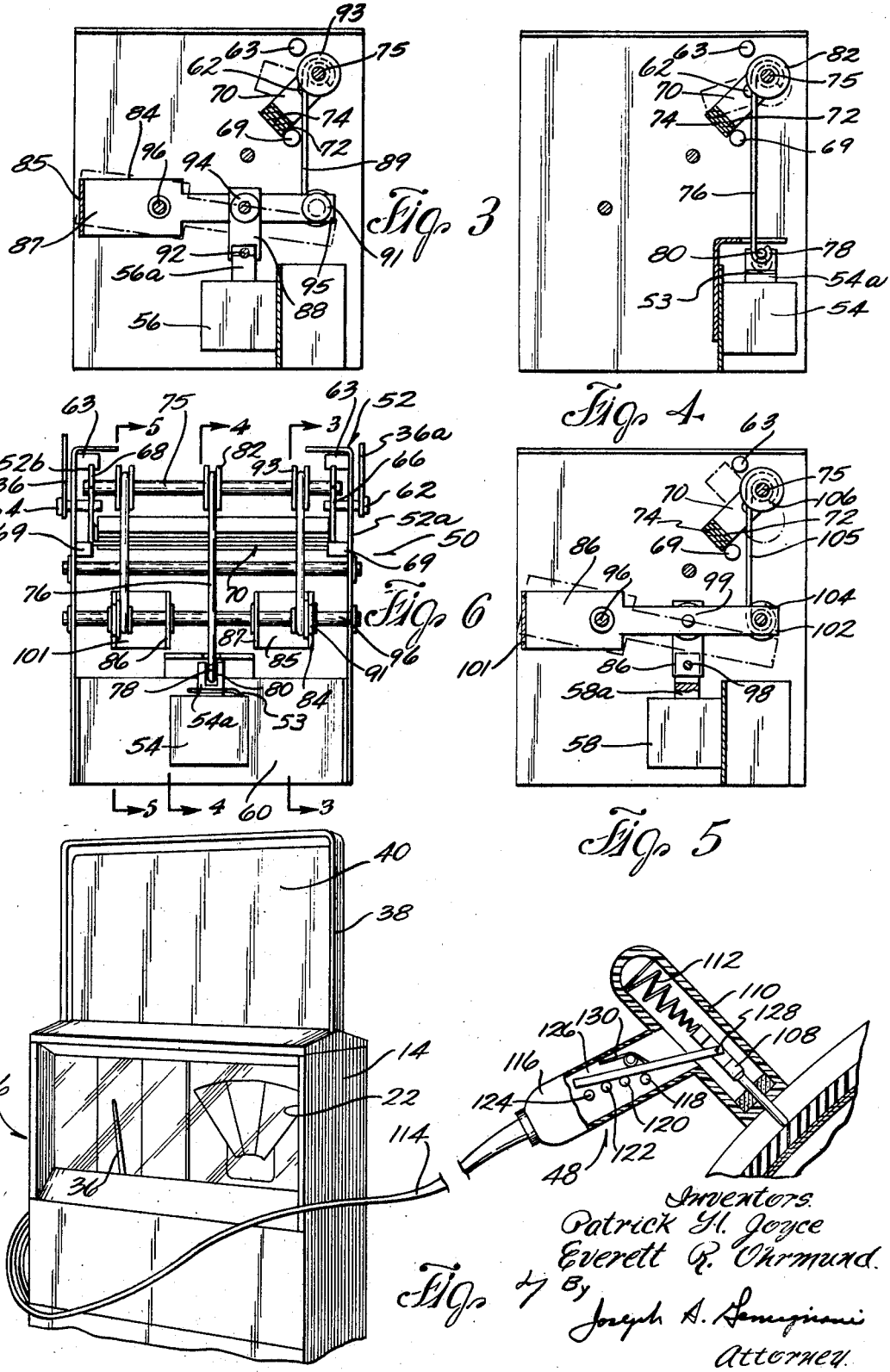

United States Patent Office 3,497,960
Patented Mar. 3, 1970

3,497,960
TESTING APPARATUS
Patrick H. Joyce, Deerfield, Ill., and Everett R. Ohrmund, Menomonee Falls, Wis., assignors to Display Corporation, Milwaukee, Wis., a corporation of Wisconsin
Filed Sept. 2, 1966, Ser. No. 576,870
Int. Cl. G01b 3/22, 5/00
U.S. Cl. 33—172                              10 Claims

ABSTRACT OF THE DISCLOSURE

An automotive tire tread depth checking apparatus having a body including a viewing panel, a pointer and an operator for moving the pointer relative to the viewing panel. A probe controls the operator and is moveable independent of the body for insertion into a tire tread and affects movement of the pointer on the viewing panel in accordance with tread depth to indicate minimal, average or unsafe tire wear.

---

This invention relates to apparatus for checking the tread depth of automotive tires to determine the amount of tire wear.

An object of this invention is to provide an effective tire tread depth checker which conveys the condition of his tires to an automobile owner in a manner which he can readily perceive and understand.

Another object of this invention is to provide an effective tire tread depth checker which can virtually be operated and understood by any motorist and can be made readily available to the motorist to thereby encourage frequent tire checking to detect excessive or uneven tire wear.

A further object of this invention is to provide a tire tread depth checker which can be made available to motorists at service stations and which can be operated and understood by the motorist without attention from the service station attendant or operator thereby affording somewhat of a self-service tire checking unit.

Other objects and advantages will be pointed out in, or be apparent from, the specification and claims, as will obvious modifications of the embodiment shown in the drawings, in which:

FIG. 1 is a front elevation of a unit incorporating this invention;

FIG. 2 is an exploded, perspective view of only the upper, visual read-out portion of the unit;

FIG. 3 is a section view along line 3—3 of FIG. 6;

FIG. 4 is a partial view along line 4—4 of FIG. 6;

FIG. 5 is a partial section view taken along line 5—5 of FIG. 6;

FIG. 6 is an end elevation of the operating means; and

FIG. 7 is a partial perspective of the unit with the probe enlarged to illustrate the operation of the unit.

With particular reference to the drawings, the tire tread depth checker is preferably incorporated in a mobile unit 10. The unit consists of a lower cabinet 12, which can be used for storage and the like, and an upper cabinet 14. The upper cabinet includes a visual read-out portion 16 having opposite facing sides 18 and 20 each of which is provided with a window such as window 22 through a viewing panel 24 is visible. The arrangement of the viewing panel, and the specific indicia provided thereon, is identical at both sides 18 and 20. For that reason only side 18 and viewing panel 24 will be described in detail, the description applying as well to side 20 and its viewing panel.

Viewing panel 24 includes three distinct vertical panels 30, 32 and 34. A movable pointer 36 is operatively arranged for movement with respect to the vertical panels. The combination of the pointer and panels 30, 32 and 34 provide a visual read-out for the tread depth checker. Pointer 36 is a part of a pointer assembly which includes two such pointers, one disposed adjacent each set of vertical panels, such as 30, 32 and 34, provided on the oppositely facing viewing panels to thereby afford a visual read-out of the tread depth checker from either side of the mobile unit. The pointer 36a which moves with respect to the vertical panels on side 20 is partially visible in FIG. 2. The arrangement whereby the pointers are moved with respect to the vertical viewing panels and the correlation of that movement with tire tread depth will be described more completely hereinafter.

It will be noted that the tread depth read-out portion of the unit does not occupy the entire upper cabinet 14. Space remains in the upper cabinet to provide a visual read-out for an additional automotive checking apparatus if desired. For example, a conventional electrical battery tester with suitable indicia 26 could be provided in the remaining portion of the upper cabinet.

To complete the outer structure of the mobile unit, a panel support frame 38 extends from the upper cabinet and provides an arrangement from which a suitable advertising panel 40 can be suspended. Panel 40 can carry any desired advertising copy, for example to indicate to the motorist the type of testing available at the unit. Feet 42 and wheels 46 provide support for the unit. With this combination of feed and wheels the testing unit is mobile and can be moved from one position to another by merely tilting the unit onto wheels 46 and rolling it to any desired location.

The structure and operation of the read-out and probe portions of the tread depth checker will be described. Vertical panels 30, 32 and 34 each correspond to a different tread depth or tire condition. Specifically, panel 34 corresponds to a condition where the tire is new or has been subjected to only the minimal amount of wear, panel 32 corresponds to a condition where the tires have undergone average wear but have not worn to an extent which would make them dangerous, and panel 30 corresponds to an excessive wear condition indicating a potential hazard in continued use of the tires. To assist in providing a readily understandable read-out, panels 30, 32 and 34 are colored red, yellow and green, respectively, a color arrangement which is readily recognized by any motorist as indicative of the above-noted tread depth conditions.

Pointer 36 can assume a position at either panel 30, as illustrated in FIG. 1, or panels 32 and 34. The position of the pointer is controlled by operating means 50 which is in turn controlled by probe means 48. The probe means is insertable in the tire tread and it and operating means 50 have operative states corresponding to each of the conditions indicated by panels 30, 32 and 34. Operating means 50 is activated to position pointer 36 at either panel 30, 32 or 34 depending on the degree of insertion of the probe means into a tire permitted by the tire tread.

As illustrated, operating means 50 includes a frame 52 and three operating solenoids 54, 56 and 58. The solenoids are supported in a conventional manner from a common bracket 60 extending between sides 52a and 52b of frame 52. Pointers 36 and 36a are each connected to a stub shaft 62 and 64 journaled for rotation in the frame sides. Stud shafts 62 and 64 are respectively connected to legs 66 and 68 of a U-shaped bracket 70. A number of metallic bars 72 are connected to web 74 of the U-shaped bracket and provide a counterweight arrangement which biases the U-shaped bracket, stub shafts 62 and 64 and pointers 36 and 36a in a counterclockwise direction as viewed in FIGS. 3, 4 and 5. Limit stops 69 and 63 are positioned to engage the U-shaped bracket and limit movement in one direction as a result of solenoid energization and in the other direction in response to solenoid de-energization. Stop 69 normally positions pointer 36 at vertical panel 30 and stop 63 positions the pointer at panel 34.

Rod 75 extends between legs 66 and 68 of the U-shaped bracket and is connected to armatures 54a, 56a and 58a of the operating solenoids. More particularly, wire 76 has a closed end 78 connected to a pin 80 anchored in armature 54a. The opposite end of wire 76 is turned back to provide a hooked end that fits over bearing 82 supported on rod 75. Accordingly, energization of solenoid 54 pivots U-shaped bracket 70 in a clockwise direction and moves stub shafts 62 and 64 and pointers 36 and 36a in a clockwise direction with respect to panels 30, 32 and 34.

Solenoids 56 and 58 could have a similar connection to rod 75, but for optimum utilization of space and to facilitate terminal connections, solenoids 56 and 58 are positioned on the side of bracket 60 opposite to that on which solenoid 54 is positioned and, therefore, the armatures of solenoids 56 and 58 cannot be directly connected to rod 75. By so staggering the solenoids on the bracket ample space is provided for wiring. The connection of solenoid armatures 56a and 58a to rod 75 is made through levers 84 and 86 and links 88 and 90. With reference to solenoid 56, link 88 extends from pin 92 on armature 56a to a bearing 94 on lever 84. Lever 84 is pivotally connected to frame sides 52a and 52b by rod 96. For better stability lever 84 is turned back at its end 85 to provide a leg 87 which also engages rod 96. Formed wire 89 has its ends engaged with bearings 91 and 93 which are in turn mounted on end 95 of lever 84 and rod 75. With this arrangement energization of solenoid 56 pivots lever 84 clockwise drawing lever end 95 down and pivoting rod 75 and pointers 36 and 36a in a clockwise direction.

Solenoid armature 58a has a similar connection to rod 75. More specifically, link 86 extends from armature pin 98 to bearing 99 on lever 86 and lever 86 has a turned end 101 which engages rod 96 at two points similar to lever 84. Free end 102 of lever 86 carries bearing 104 which is connected by means of wire 105 to bearing 106 on rod 75. Again, when solenoid 58 is energized link 86 is drawn downwardly to correspondingly pivot lever 86 in a counterclockwise direction and rotate U-shaped bracket 70 and stub shafts 62 and 64 in a clockwise direction.

In this manner when solenoids 54, 56 and 58 are actuated rod 75 is pivoted against the counterweight provided by U-shaped bracket 70 and pivots the pointers in a counterclockwise direction (as viewed in FIG. 2) with respect to their vertical panels. The solenoids are provided with suitable stop arrangements (not shown) to limit armature movement and provide different degrees of actuation. For example these stops are shown as springs 53 (see FIG. 6) supported in a groove in armature 54a to engage the upper side of the solenoid coil frame. The other armatures have similar arrangements (not shown) but with the springs assuming different positions on their respective armatures. With this arrangement, actuation of each solenoid provides a different amount of movement of its respective armature and U-shaped bracket 70. When solenoid 54 is operated pointer 36 remains at panel 30, when solenoid 56 is operated the pointer is moved into the area of panel 32 and when solenoid 58 is operated the pointer is moved to the area of the last panel 34.

Selective operation of the solenoid to achieve pointer movement is controlled through probe means 48. Probe means 48 includes a plunger 108 arranged in and extending exteriorly of a housing portion 110. Springs 112 normally biases plunger 108 to a fully extended position projecting from housing portion 110. Electrical leads 114 from the operating solenoids enter a housing portion 116, which extends laterally from housing portion 110, and are suitably connected to a switch device included in housing portion 116. More specifically, the switch includes four stationary contacts 118, 120, 122 and 124 and a movable switch blade 126. Switch blade 126 is connected to plunger 108 at pin 128 and extends into housing portion 116 where it is engaged by spring 130 which biases switch blade 126 into engagement with contacts 118–124. The fixed contacts are arranged on an arc so that the switch blade selectively bridges between only two of the contacts at any given time. When contacts 118 and 120 are bridged by the switch arm, solenoid 58 is energized and pointer 36 is moved through its complete range of movement to panel 34. Similarly when switch arm 126 bridges contacts 120 and 122 solenoid 56 is energized and the pointer is positioned at panel 32 and when the switch arm bridges contacts 122 and 124 solenoid 54 is energized and the pointer remains in the area of panel 30. Accordingly, it can be seen that when the tire checker is initially energized the pointer 36 will assume a position at panel 34 as the switch arm will normally bridge contacts 118 and 120 with the plunger fully extended. If the tread being checked is of sufficient depth, for example a new tire or one with minimal wear, the probe means can be inserted into the tread without any appreciable movement of plunger 108 and switch arm 126 remains in bridging contact with contacts 118 and 120 and the pointers remain in registry with panel 34. If the tire is worn past a predetermined tread depth then insertion of the probe means in the tire will result in movement of plunger 108 into housing 110 sufficient to pivot switch arm 126 out of bridging engagement with contacts 118 and 120 and into bridging engagement with contacts 120 and 122. This de-energizes solenoid 58 and energizes solenoid 56 to position the pointers at panel 32. In the event that tire wear has been excessive and very little tread depth remains then insertion of the probe means will result in considerable plunger movement sufficient to disengage switch arm 126 from bridging relationship with contacts 120 and 122 and move the switch arm into bridging relationship with contacts 122 and 124 and correspondingly energize solenoid 54 and position the pointers at panel 30. A suitable on-off switch (not shown) could be provided to selectively energize the tire checker so that the solenoids are only energized when the checker is in operation.

In order to emphasize the read-out afforded by the tire checker, a system of lights can also be utilized in cooperation with the vertical read-out panels. For example, upper cabinet 14 can include a framework 126 which includes vertical partitions 128, 130 and 132, see FIG. 2. In the assembled unit partitions 128, 130 and 132 are positioned along the margins of viewing panels 30, 32 and 34 separating the areas behind the viewing panels into distinct compartments. An upper frame 134 carries light bulbs 136, 138 and 140 which in the assembled unit are positioned within each of the defined chambers. Through suitable conventional circuitry, not shown, light bulbs 136, 138 and 140 are also controlled by probe means 48 and correlated with solenoids 54, 56 and 58 such that when a given solenoid is energized to move pointer 36 to one of the three panels the light behind that panel is also energized to provide a marked visual effect.

The tire tread depth checker of this invention can be operated by any motorist merely by manipulation of probe means 48. This manipulation of the probe means is much the same as the manipulation required in using the conventional air hose used to inflate tires, an operation with which virtually all motorists are familiar. Accordingly, this tire tread checker will provide a ready check of tire tread depth and in a manner which is familiar to any motorist and does not require any complex operating procedures to thereby encourage frequent tread depth checks. It should also be noted that in addition to merely checking tread depth, the motorist can also check for uneven tire wear by moving the probe across the tread face and taking several readings in a given area on the tire. In this manner the motorist can also immediately and reliably determine such uneven wear which will indicate the need for either tire balancing or front end alignment. In this connection it will be appreciated that although three very broad ranges of tire tread conditions have been illustrated, the ranges could be narrowed down and the probe switch so calibrated that minor variations in tread depth could be detected as well as excessive wear and actuators other than the illustrated solenoids could be used. This would have added significance in checking uneven tire wear and would permit the motorist to reliably determine if uneven tire wear were present so that the need for a tire balancing or front end alignment could be detected and corrected before excessive tire wear had occurred. This is significant since in many instances visual inspection of the tire will not expose uneven wear unless that wear is excessive and once excessive wear becomes evident it may be too late to correct the condition and save the tire. Accordingly, it will be appreciated that although this invention is specifically described in connection with a tread depth checker which merely gives a visual read-out of full tread depth, satisfactory tread depth or excessive wear, it is contemplated that this invention covers modifications where narrower tread wear ranges are encountered.

Although but one embodiment of the present invention has been illustrated and described, it will be apparent to those skilled in the art that various changes and modifications may be made therein without departing from the spirit of the invention.

We claim:

1. Automotive tire tread depth checking apparatus comprising, in combination,
   a body,
   a portion of said body including means defining an exposed viewing panel,
   said viewing panel including a plurality of distinct portions each corresponding to a different tread depth,
   pointer means,
   means supporting said pointer means in said body at said viewing panel and including rotatably mounted first shaft means connected to said pointer means for moving said pointer means with respect to said distinct portions when said first shaft means is rotated,
   bracket means connected to and rotatable with said first shaft means,
   second shaft means connected to said bracket means in spaced relation from the connection of said first shaft means to said bracket means so that said second shaft means and bracket means are pivotable about an axis defined by said first shaft means,
   first and second stop means arranged for engagement with said bracket means to limit movement of said pointer means relative to said viewing panel at the two extreme ends of travel of said pointer means relative to said viewing panel,
   operating means having a plurality of electrical actuators each corresponding generally to a distinct tread depth indicating portion of said viewing panel, each of said electrical actuators connected to said second shaft means and operative when actuated to pivot said second shaft means and bracket means and move said pointer means to a corresponding tread depth indicating portion on said viewing panel,
   counterweight means operatively connected to said first and second shaft means and bracket means and biasing said first and second shaft means and bracket means to a normal position with said bracket means engaging one of said stop means and positioning said pointer means relative to said viewing panel, said electrical actuators operating against said counterweight means in moving said pointer means relative to said viewing panel,
   probe means insertable in a tire tread and having a plurality of operative states corresponding generally to said operative states of said operating means and the depth of said tread so that upon insertion of said probe means into a tire tread said operating means is operated in accordance with said tread depth and moves said pointer means to a tire tread indicating portion on said viewing panel corresponding to the depth of said tread,
   and means connecting said probe means to said operating means and for manipulation independently of said body so that as said probe means is moved to selected positions on a tire tread said body will remain stationary and a selected viewing position of said viewing panel will not be disturbed.

2. The tire tread depth checking apparatus of claim 1 wherein
   said body has oppositely facing sides,
   said viewing panel defining means defines a viewing panel exposed at both said oppositely facing sides,
   and said pointer means is disposed at and movable with respect to both of said viewing panels.

3. The tire tread depth checking apparatus of claim 1 including wheel means connected to said body and providing mobility for said apparatus.

4. The tire tread depth checking apparatus of claim 1 wherein
   said viewing panel includes three portions corresponding to safe, caution and danger conditions of tire depth,
   and said operating means includes three electrical actuators corresponding to said safe, caution and danger conditions and operative to move said pointer means selectively to one of said viewing panel positions.

5. The tire tread depth checking apparatus of claim 4 wherein said probe means includes electrical switch means having three operative states corresponding to said safe, caution and danger conditions,
   wherein said probe means also includes plunger means operatively connected to said switch means and movable with respect to said switch means to operate said switch means to one of its three operative states in accordance with the amount of probe means movement necessary to insert the probe means into the full depth available in said tread,
   and wherein said plunger means also includes spring means normally biasing said plunger outwardly to a maximum readout position when said probe means is free of said tire and movement of said plunger means upon insertion into a tire tread is against said bias.

6. The tire tread depth checking apparatus of claim 5 wherein
   said body has oppositely facing sides,
   said viewing panel defining means defines a viewing panel exposed at both said oppositely facing sides,
   and said pointer means is disposed at and movable with respect to both of said viewing panels.

7. Automotive tire tread depth checking apparatus comprising, in combination,
   means defining a body including a visual read-out area having indicia corresponding to different tread depths,
   pointer means,
   means supporting said pointer means at said visual read-out area and including rotatably mounted first shaft means connected to said pointer means for moving said pointer means with respect to said indicia when said first shaft means is rotated,
   bracket means connected to and rotatable with said first shaft means,
   second shaft means connected to said bracket means in spaced relation from the connection of said first shaft means to said bracket means so that said second shaft means and bracket means are pivotable about an axis defined by said first shaft means,
   first and second stop means arranged for engagement with said bracket means to limit movement of said pointer means relative to said visual read-out area at the two extreme ends of travel of said pointer means relative to said visual read-out area, operating means having a plurality of electrical actuators each corresponding generally to a different tread depth indicia of said visual read-out area, each of said electrical actuators connected to said second shaft means and operative when actuated to pivot said second shaft means and bracket means and move said pointer means to a corresponding tread depth indicia on said read-out area, counterweight means operatively connected to said first and second shaft means and bracket means and biasing said first and second shaft means and bracket means to a normal position with said bracket means engaging one of said stop means and positioning said pointer means relative to said visual read-out area, said electrical actuators operating against said counterweight means in moving said pointer means relative to said visual read-out area, manual probe means manually insertable in a tire tread and having a plurality of operative states corresponding generally to said electrical actuators and the depth of said tread, said probe means operative, upon insertion of said probe means into a tire tread, to actuate one of said electrical actuators in accordance with said tread depth and position said pointer means at indicia on said read-out area corresponding to the depth of said tread, and means connecting said probe means to said operating means and for manipulation independently of said body so that as said probe means is moved to selected positions on a tire tread said body will remain stationary and a selected viewing position of said viewing panel will not be disturbed.

8. The tire tread depth checking apparatus of claim 7 wherein said probe means includes a plunger, spring means supporting said plunger for insertion into a tire tread and to assume a position corresponding to tread depth, said spring means extending said plunger to its maximum read-out position when said probe is free of said tire tread, switch means having a plurality of operative states corresponding to the electrical actuators of said operating means, and means connecting said switch means to said plunger for operation of said switch means by said plunger and in accordance with the position of said plunger as determined by tread depth.

9. The tire tread depth checking apparatus of claim 1 wherein said means connecting said probe means to said operating means extends from said body to said probe means and is characterized by being elongated and flexible to thereby provide for said movement of said probe means independently of said body.

10. The tire tread depth checking apparatus of claim 7 wherein said means connecting said probe means to said operating means extends from said body to said probe means and is characterized by being elongated and flexible to thereby provide for said movement of said probe means independently of said body.

References Cited

UNITED STATES PATENTS

| | | | |
|---|---|---|---|
| 2,707,334 | 5/1955 | Skrobisch | 33—178 |
| 2,642,471 | 6/1953 | Graham et al. | 33—178 |
| 2,635,347 | 4/1953 | Gelfand | 33—174 |
| 2,619,956 | 12/1953 | Torricelli | 33—174 |
| 3,307,006 | 2/1967 | Lawrence | 200—168 |
| 3,298,605 | 1/1967 | Bucke et al. | |
| 2,287,273 | 6/1942 | Rabb. | |
| 1,723,172 | 8/1929 | Huggins | 73—313 |
| 1,324,574 | 12/1919 | Wetzel | 177—177 |
| 980,851 | 1/1911 | Updegraff. | |

LEONARD FORMAN, Primary Examiner

ROGER A. FIELDS, Assistant Examiner